(12) United States Patent
Asher

(10) Patent No.: US 7,898,940 B2
(45) Date of Patent: Mar. 1, 2011

(54) SYSTEM AND METHOD TO MITIGATE PHYSICAL CABLE DAMAGE

(75) Inventor: Michael Asher, Clay County, FL (US)

(73) Assignee: AT&T Intellectual Property I, L.P., Reno, NV (US)

(*) Notice: Subject to any disclaimer, the term of this patent is extended or adjusted under 35 U.S.C. 154(b) by 286 days.

(21) Appl. No.: 12/336,049

(22) Filed: Dec. 16, 2008

(65) Prior Publication Data

US 2010/0149964 A1 Jun. 17, 2010

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl. ........................ 370/216; 370/225
(58) Field of Classification Search ............ 370/216, 370/225; 705/7
See application file for complete search history.

(56) References Cited

U.S. PATENT DOCUMENTS

| | | | |
|---|---|---|---|
| 6,751,554 B1 * | 6/2004 | Asher et al. | 702/5 |
| 6,958,690 B1 * | 10/2005 | Asher et al. | 340/531 |
| 7,626,496 B1 * | 12/2009 | Asher | 340/531 |
| 2010/0161359 A1 * | 6/2010 | Asher | 705/7 |

* cited by examiner

*Primary Examiner*—Ricky Ngo
*Assistant Examiner*—David Oveissi
(74) *Attorney, Agent, or Firm*—Hoffman & Baron, LLP

(57) ABSTRACT

Method, system and computer-readable medium for handling a dig ticket to mitigate physical cable damage are disclosed. In accordance with the method, a network alarm indicating a logical circuit is received. The logical circuit is mapped to at least one physical cable segment associated with the logical circuit. One or more other physical cable segments diversity of which is affected by the at least one physical cable segment are determined. The diversity associated with the one or more other physical cable segments is updated. The dig ticket is processed based at least on a risk factor that accounts for the diversity of at least one physical cable segment of the one or more other physical cable segments.

24 Claims, 4 Drawing Sheets

SYSTEM AND METHOD TO MITIGATE PHYSICAL CABLE DAMAGE

TECHNICAL FIELD

The present application relates generally to handling dig tickets. More specifically, the present application is directed to a system, method and computer storage medium for handling dig tickets to mitigate physical cable damage.

BACKGROUND

An industrialized nation, such as the United States, has a vast underground infrastructure of pipelines, conduits, wires and cables that are critical to continued functioning of the nation (hereinafter "infrastructure"). This infrastructure provides crude oil and petroleum products, natural gas, telecommunications, electricity, water, cable television, as well as other vital products and services. Disruption of any part of the infrastructure could affect public and environmental safety, as well as continued reliability of the services.

A leading cause of disruption of services (e.g., telecommunication services) is external damage to the infrastructure that occurs during excavation. The telecommunications services may include distribution of any electronic content, such a video content, audio content, and audiovisual content. A telecommunication provider (e.g., AT&T) may perform a set of internal processes to protect its network against "internal failures," such as failed or failing network equipment and misconfigured network equipment (e.g., routers, switches, or other equipment). The telecommunication provider may also perform a set of external processes to protect against "external failures," such as excavations by others (e.g., utility companies) that may cause damage to the telecommunication infrastructure (e.g., telecommunication cables).

Internal failures generally trigger network alarms that may result in network re-configuration and/or dispatch of maintenance technicians to correct the internal failures. In the United States, protection from external failures (e.g., excavation damage) generally involves responding to "dig tickets" generated by a national "Call Before You Dig" program. The response to a dig ticket may range from issuance of an "all clear" response that allows excavation to proceed up to dispatch of a maintenance technician who may mark a telecommunication cable location (and may remain onsite during excavation) to protect the telecommunication cable against physical damage.

The telecommunication provider may receive millions of dig tickets per year. Because of the immense volume of dig tickets, the telecommunication provider cannot exert a maximum response (e.g., technician dispatch) to each of the dig tickets, particularly as most dig tickets exhibit little to no real risk of physical damage to the telecommunication cables. To deal with the volume, the telecommunication provider computes a risk factor associated with excavation of a telecommunication cable, generally based on a type of activity associated with the dig ticket and its geographical proximity to the telecommunication cable. The computed risk factor is used to automatically process dig tickets and to select dig tickets for technician location and marking activities.

SUMMARY

In accordance with a particular embodiment, a method of handling a dig ticket to mitigate physical cable damage is disclosed. The method includes receiving a network alarm indicating a logical circuit. The method further includes mapping the logical circuit to at least one physical cable segment associated with the logical circuit. The method also includes determining one or more other physical cable segments diversity of which is affected by the at least one physical cable segment. Still further, the method includes updating the diversity associated with the one or more other physical cable segments. Yet further, the method includes processing the dig ticket based at least on a risk factor that accounts for the diversity of at least one physical cable segment of the one or more other physical cable segments.

In accordance with another embodiment, a system for handling a dig ticket to mitigate physical cable damage. The system includes an alarm receiver module, a circuit-segment mapper module, a segment diversity update module, and a ticket processing module. The alarm receiver module is configured to receive a network alarm indicating a logical circuit. The circuit-segment mapper module is configured to map the logical circuit to at least one physical cable segment associated with the logical circuit. The segment diversity update module is configured to determine one or more other physical cable segments diversity of which is affected by the at least one physical cable segment, the segment diversity update module further configured to update the diversity associated with the one or more other physical cable segments. The ticket processing module is configured to process the dig ticket based at least on a risk factor that accounts for the diversity of at least one physical cable segment of the one or more other physical cable segments.

In accordance with another embodiment, a computer-readable storage medium is disclosed. The medium stores operational instructions that, when executed by a processor, cause the processor to receive a network alarm indicating a logical circuit. The medium further stores operational instructions that, when executed by a processor, cause the processor to map the logical circuit to at least one physical cable segment associated with the logical circuit. The medium also stores operational instructions that, when executed by a processor, cause the processor to determine one or more other physical cable segments diversity of which is affected by the at least one physical cable segment. Still further, the medium stores operational instructions that, when executed by a processor, cause the processor to update the diversity associated with the one or more other physical cable segments. Yet further, the medium stores operational instructions that, when executed by a processor, cause the processor to process a dig ticket based at least on a risk factor that accounts for the diversity of at least one physical cable segment of the one or more other physical cable segments.

BRIEF DESCRIPTION OF THE DRAWINGS

Some embodiments are illustrated by way of example and not limitation in the figures of the provided drawings in which.

DETAILED DESCRIPTION

Figure 1:
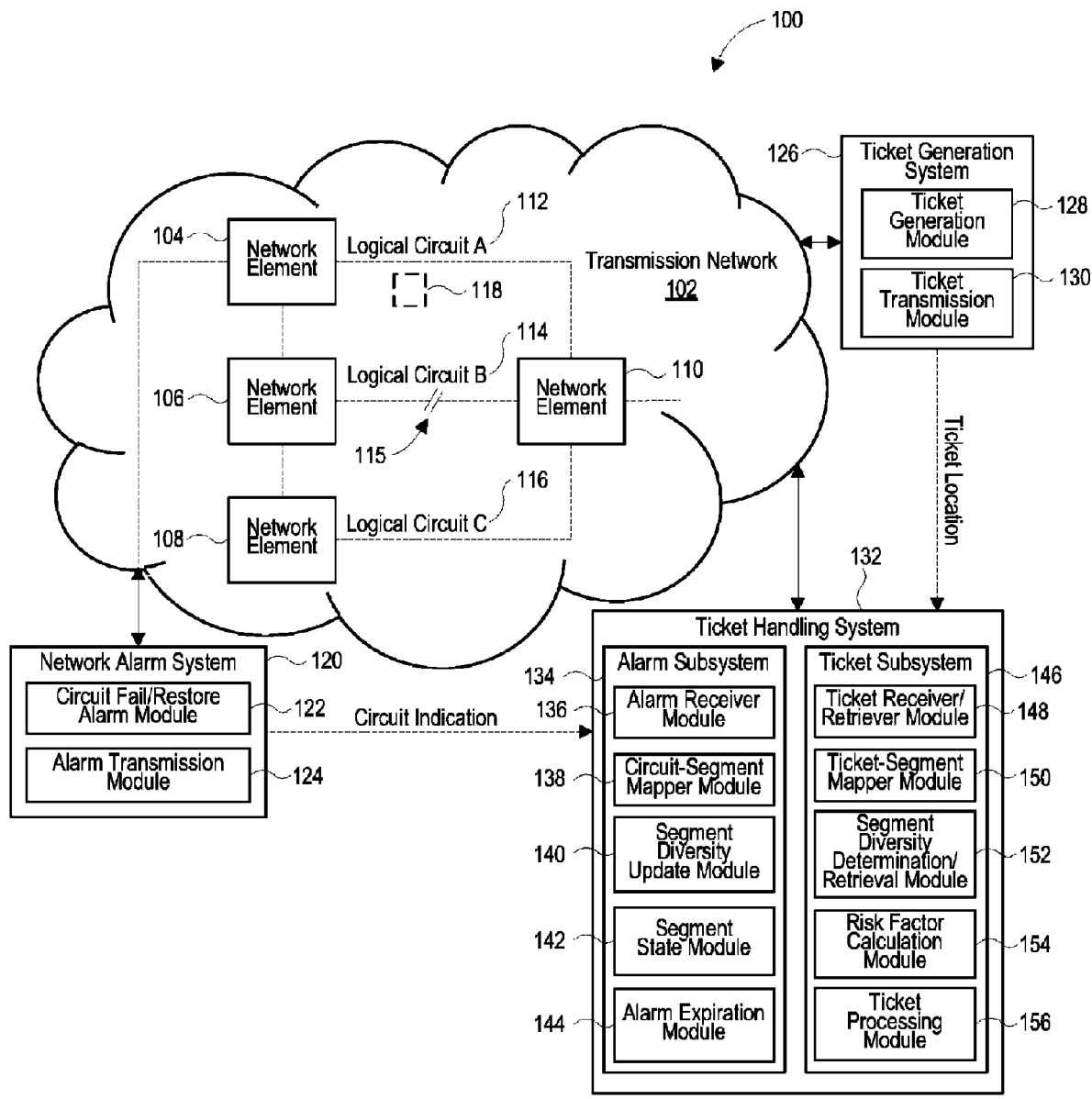
FIG. 1 is a block diagram of a system configured to mitigate physical cable damage of a transmission network based on one or more network alarms associated with the transmission network.

FIG. 1 is a block diagram of a system 100 configured to mitigate physical cable damage of a transmission network 102 based on one or more network alarms associated with the transmission network 102. The system 100 includes a transmission network 102, a network alarm system 120, a ticket generation system 126 and a ticket handling system 132.

The transmission network 102 is configured to distribute telecommunication content (e.g., video, audio and audiovisual content) associated with telecommunication services (e.g., telephone, television and Internet services, as well as, other electronic services) provided by a telecommunication provider (e.g., AT&T) (not shown) to and from one or more telecommunication receivers (not shown).

The telecommunication content may be distributed over the transmission network via Transfer Control Protocol/Internet Protocol (TCP/IP), any combination conventional protocols or yet to be developed protocols. The transmission network 102 may include one or more of a long haul transport network (e.g., a gigabit Ethernet network, an Asynchronous Transfer Mode (ATM) network, a frame relay network), a wireless network (e.g., a satellite network, a Wi-Fi network, or another wireless network), other public or private networks, or any combination thereof The transmission network 102 may also include connections, such as fiber to the home (FTTH), fiber to the node (FTTN), telephone (e.g., digital subscriber line (DSL)), coaxial cable, hybrid fiber/coaxial, wireless or any other combination thereof The foregoing is not exhaustive and alternate or additional transmission networks as well as connections may be employed to interconnect the transmission network 102 to the telecommunication receivers.

The transmission network 102 illustrates an example topology of representative network elements 104-110 configured to distribute telecommunication content between a telecommunication provider and one or more telecommunication receivers. The network elements 104-110 may include physical devices, such as routers, switches, bridges, hubs, and other physical devices, as well as, logical entities that unite one or more physical devices, such as a database and a signaling system, which may be used to route and transmit telecommunication content.

The network elements 104-110 may form plural logical circuits 112, 114, 116 configured to provide alternate paths or routes (e.g., diversity) for the distribution of telecommunication content between the telecommunication provider and the one or more telecommunication receivers in a case that a path or route becomes unavailable in the transmission network 102. In the example topology of transmission network 102, logical circuit A 112 represents a first path or route between network elements 104 and 110; logical circuit B 114 represents a second path or route between network elements 104 and 110, via network element 106; and logical circuit C 116 represents a third path or route between network elements 104 and 110, via network elements 106, 108. Each of the plural logical circuits 112, 114, 116 may include one or more physical cable segments, which may be disposed underground (not shown) and which may be subjected to physical damage, such as during excavation.

A logical circuit may fail because of a misconfigured, damaged, or otherwise inoperable network element (e.g., network failure) or because of physical damage to a physical cable segment of the logical circuit (e.g., physical cable damage). For example, failure of network element 106 or physical damage to a physical cable segment of a logical circuit B 114 may render the logical circuit B 114 unavailable for transmission of telecommunication content between a telecommunication provider and one or more telecommunication receivers, as indicated at 115. Additionally, failure of network element 106 may also impact the availability of logical circuit C 116 for transmission of telecommunication content.

In the example topology of transmission network 102, the failure of a logical circuit (e.g., logical circuit B 114) affects diversity of other logical circuits (e.g., logical circuit A 112 and logical circuit C 116) for the transmission of telecommunication content between a telecommunication provider and one or more telecommunication receivers, while the logical circuit (e.g., logical circuit B 114) is unavailable. Generally, if one logical path or route is unavailable due to network failure or physical cable damage, and there is a multiplicity of alternate paths or routes available to handle distribution of telecommunication content between a telecommunication provider and one or more telecommunication receivers, then the possibility of downtime of the transmission network 102 is minimal as there is sufficient diversity for the distribution of telecommunication content.

However, as illustrated in the example topology of transmission network 102, when alternate paths or routes available to handle distribution of telecommunication content are limited due to the unavailability of logical circuits, the possibility of network downtime of the transmission network 102 is substantially increased with the decreased diversity of logical circuits. This situation may be further exacerbated when excavation (via dig tickets) may affect physical cable segments associated with logical circuits of the already limited paths or routes available to handle distribution of the telecommunication content, further decreasing or completely eliminating diversity for the distribution of telecommunication content.

Now with further reference to system 100, the network alarm system 120 is configured to monitor the transmission network 102 and further configured to generate network alarms that indicate failure and/or restoration of the availability of logical circuits 112-116 for distribution of telecommunication content over transmission network 102. More specifically, the network alarm system 120 includes a circuit fail/restore alarm module 122 and an alarm transmission module 124. The circuit fail/restore alarm module 122 is configured to monitor the network elements 104-110 and the logical circuits 112-116 of the transmission network 102 and further configured to generate network alarms that indicate failure and/or restoration of the availability of logical circuits 112-116 for distribution of telecommunication content. The alarm transmission module 124 is configured to transmit the alarms generated by the circuit fail/restore alarm module 122 to the ticket handling system 132.

The ticket generation system 126 is configured to generate one or more dig tickets associated with one or more excavations. The ticket generation system 126 may be a one-call center. Physical locations of the one or more excavations may be associated with or may affect physical cable segments of one or more of the logical circuits 112-116, as will be described in greater detail below. More specifically, the ticket generation system 126 includes a ticket generation module 128 and a ticket transmission module 130. The ticket generation module 128 is configured to generate one or more dig tickets associated with the one or more excavations. Each dig ticket includes a physical location for the excavation. For example, the physical location may be represented by coordinate information, address information, street intersection information, or other location information to locate the dig ticket. As an example, the ticket generation module 128 may generate a dig ticket 118, the location of which is associated with or affects physical cable segments of a logical circuit, such as logical circuit A 112. The ticket transmission module 130 is configured to transmit the one or more dig tickets generated by the ticket generation module 128 to the ticket handling system 132.

The ticket handling system 132 is configured to process dig tickets received from the ticket generation system 126 (e.g., responses by the telecommunication provider to received dig tickets) in accordance with network alarms received from the network alarm system 120. More specifically, the ticket handling system 132 includes an alarm subsystem 134 and a ticket subsystem 146. The alarm subsystem 134 is configured to determine diversity of one or more physical cable segments of the transmission network 102 in accordance with network alarms received from the network alarm system 120. The ticket subsystem 146 is configured to process a response to the received dig tickets at least in accordance with the diversity determined by the alarm subsystem 134.

Now with particular reference to the alarm subsystem 134 of the ticket handling system 132, the alarm subsystem 134 includes an alarm receiver module 136, a circuit-segment mapper module 138, a segment diversity update module 140, a segment state module 142, and an alarm expiration module 144. The alarm receiver module 136 is configured to receive one or more network alarms from the network alarm system 120 that indicate failure and/or restoration of the availability of logical circuits 112-116 for distribution of telecommunication content over transmission network 102. A network alarm may indicate a particular logical circuit that has failed (e.g., logical circuit B 114) and may optionally set an expiration time associated with the alarm (e.g., 15 minutes), or the alarm may indicate a particular logical circuit that has been restored (e.g., made available to distribute telecommunication traffic over the transmission network 102). The alarm receiver module 136 is further configured to transmit expiration time periods associated with the one or more network alarms, if any, to the alarm expiration module 144, which will be described in greater detail below.

The circuit-segment mapper module 138 is configured to map a logical circuit indicated as failed/restored in a received network alarm to at least one physical cable segment of the transmission network 102. For example, the circuit-segment mapper module 138 may map a failed logical circuit B 114, as indicated at 115, to at least one physical cable segment of the logical circuit B 114. Likewise, the circuit-segment mapper module 138 may map a restored logical circuit 114 to at least one physical cable segment of the logical circuit B 114.

The segment diversity update module 140 is configured to determine one or more other physical cable segments the diversity of which may be affected by the at least one physical cable segment of the failed or restored logical circuit indicated by the network alarm. More specifically, the failure or restoration of a logical circuit (e.g., logical circuit B 114) may be indicated by different network alarms, or by an expiration of a time period indicated by a network alarm that indicated the failure of the logical circuit. The segment diversity update module 140 is further configured to update the diversity of the one or more other physical cable segments the diversity of which was determined to be affected. For example, the segment diversity update module 140 may update the diversity of at least one physical cable segment associated with logical circuit A 112 and at least one physical cable segment associated with logical circuit C 116, which were affected by the at least one physical cable segment of the failed or restored logical circuit B 114.

The segment state module 142 is configured to toggle a state flag (e.g., set or reset state) associated with each of the one or more physical cable segments indicating affected diversity. For example, state flags of the one or more physical cable segments of logical circuit A 112 and one or more physical cable segments of logical circuit C 116 may be set (e.g., set to a value associated with reduced diversity), when diversity is reduced by the failure of the logical path B 114. As another example, the state flags of the one or more physical cable segments of logical circuit A 112 and one or more physical cable segments of logical circuit C 116 may be reset (e.g., set to a value associated with increased diversity), when diversity is increased by the restoration of the logical path B 114.

The alarm expiration module 144 is configured to receive an expiration time period, if any, associated with a network alarm from the alarm receiver module 136, to decrement the expiration time period from time of receipt, and to indicate the expiration of the expiration time period in the alarm subsystem 136. The segment diversity update module 140 may use the expiration indication to update diversity as described above.

Now with particular reference to the ticket subsystem 146 of the ticket handling system 132, the ticket subsystem 146 is configured to process dig tickets received from the ticket generation system 126 in accordance with one or more network alarms received from the network alarm system 120. The ticket subsystem 146 includes a ticket receiver/retriever module 148, a ticket-segment mapper module 150, a segment diversity determination/retrieval module 152, a risk factor calculation module 154 and a ticket processing module 156.

The ticket receiver/retrieval module 148 is configured to receive one or more dig tickets from the ticket generation system 126. The received one or more dig tickets may be stored in a database (not shown), which may be included in the ticket handling system 132. The ticket receiver/retrieval module 148 is further configured to retrieve a stored dig ticket when at least one physical cable segment that affects the dig ticket has been toggled by the segment state module 142, indicating that the diversity of the at least one physical cable segment has been updated by the segment diversity updated module 140.

The ticket-segment mapper module 150 is configured to map a received dig ticket to at least one physical cable segment of the transmission network 102. The segment diversity determination/retrieval module 152 is configured to determine the diversity of the at least one physical cable segment of the transmission network 102 associated with a received ticket. The segment diversity determination/retrieval module 152 is further configured to retrieve diversity of the at least one physical cable segment associated with a stored dig ticket. The risk factor calculation module 154 is configured to calculate a risk factor for a physical cable segment of the at least one physical cable segment as a function of traffic volume on the physical cable segment, diversity of the physical cable segment (as a percentage), and a distance between a location of the dig ticket and a location the physical cable segment. The ticket processing module 156 processes the dig ticket (received or retrieved) associated with the at least one physical cable segment in accordance with or based on the calculated risk factor.

Whether a received or a stored dig ticket is processed by the ticket processing module 156, processing of the dig ticket is based on a calculated risk factor that accounts for network alarms, if any, which may affect diversity of at one physical cable segment (of a logical circuit) associated with the dig ticket. Thus, in the example topology of the transmission network 102, the processing of the dig ticket 118 is based on a calculated risk factor that accounts for network alarms associated with logical circuit B 114 that affects diversity of at least one physical cable segment of logical circuit A 112 associated with the dig ticket 118. For example, the processing may facilitate a response to the dig ticket that may range from issuance of an "all clear" response that allows excavation to proceed up to dispatch of a maintenance technician who may mark a location of the at least one physical cable segment (and may remain onsite during excavation) to protect the at least one physical cable against physical damage. More specifically, a particular value of the calculated risk factor, as impacted by any updated diversity resulting from network alarms, may indicate or correlate to a potential response from a continuum of potential responses which may range from a maximal response in terms of cost/effort (e.g., deployment of maintenance technician(s)) through to a minimal response (e.g., entirely automated processing without technician involvement).

Figure 2:
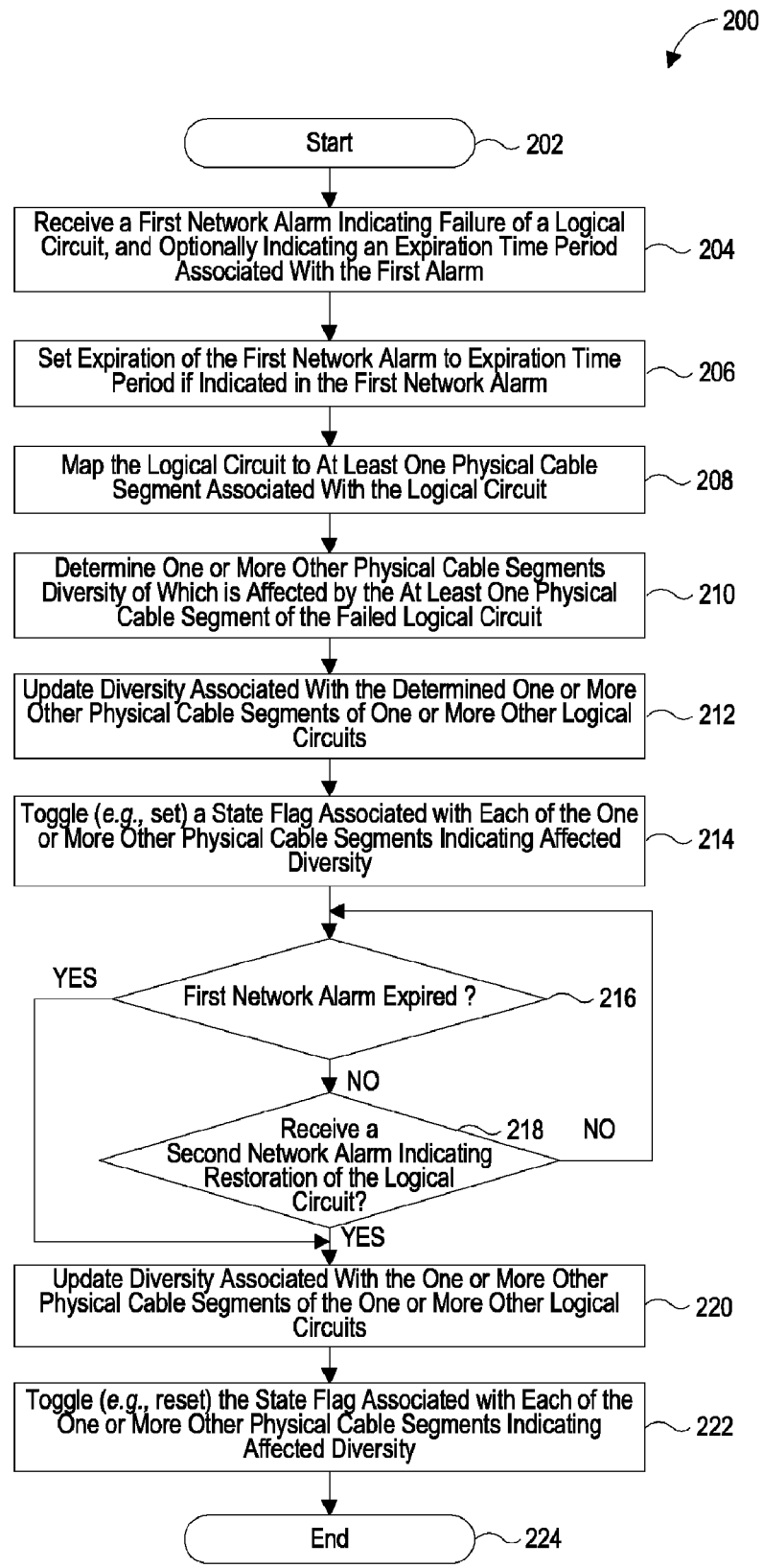
FIG. 2 is a flowchart that illustrates an example method to update diversity of one or more physical cable segments based on one or more network alarms associated with a logical circuit.

FIG. 2 is a flowchart that illustrates an example method 200 to update diversity of one or more physical cable segments based on one or more network alarms associated with a logical circuit. The method 200 starts at operation 202. At operation 204, a first network alarm that indicates a failure of a logical circuit is received. The first network alarm may optionally indicate an expiration time period associated with the first network alarm. For example, alarm receiver module 136 may receive the first network alarm that indicates failure of logical circuit B 114 and an expiration time period of 15 minutes. At operation 206, the expiration of the first network alarm is set to the expiration time period if indicated in the first network alarm. At operation 208, the logical circuit is mapped to at least one physical cable segment associated with the logical circuit. For example, the circuit-segment mapper module 138 may map the logical circuit B 114 to at least one or more physical cable segments associated with the logical circuit B 114.

At operation 210, one or more other physical cable segments (of one or more other logical circuits) diversity of which is affected by the at least one physical cable segment are determined. At operation 212, diversity associated with the determined one or more other physical cable segments is updated. For example, the segment diversity update module 140 may determine other physical cable segments of logical circuit A 112 and other physical cable segments of logical circuit C 116 at operation 210 and may further update their diversity at operation 212.

At operation 214, a state flag associated with each of the one or more other physical cable segments indicating affected diversity is toggled (e.g., set). For example, the segment state module 142 may toggle a state flag associated with each of the other physical cable segments of logical circuit A 112 and the other physical cable segments logical of circuit C 116 to a value indicating affected diversity (e.g., a value indicating reduced diversity).

At operation 216, a determination is made whether the first network alarm has expired. This determination may be made on the basis of whether the expiration time period indicated by the first network alarm has expired. For example, the alarm expiration module 144 may determined whether the expiration time period indicated by the first network alarm has expired. If it is determined that first network alarm has expired at operation 216, the method 200 continues at operation 220. Alternatively, if it is determined that first network alarm has not expired at operation 216, the method continues at operation 218, where a determination is made as to whether a second network alarm indicating restoration of the logical circuit is received. For example, the alarm receiver module 136 may receive the second network alarm. If it is determined that a second network alarm indicating restoration of the logical circuit is not received at operation 218, the method 200 continues at operation 216. Alternatively, if it is determined that the second network alarm indicating restoration of the logical circuit is received at operation 218, the method 200 continues at operation 220. Therefore, either the first network alarm expires or it is effectively cancelled by the second network alarm.

At operation 220, diversity associated with the one or more other physical cable segments of the one or more other logical circuits is updated. At operation 222, the state flag associated with each of the one or more other physical cable segments indicating affected diversity is toggled (e.g., reset). For example, the segment state module 142 may toggle the state flag associated with each of the other physical cable segments of logical circuit A 112 and each of the other physical cable segments of logical circuit C 116 to a value indicating affected diversity (e.g., value indicating increased diversity). Thereafter, the method 200 ends at operation 224.

Figure 3:
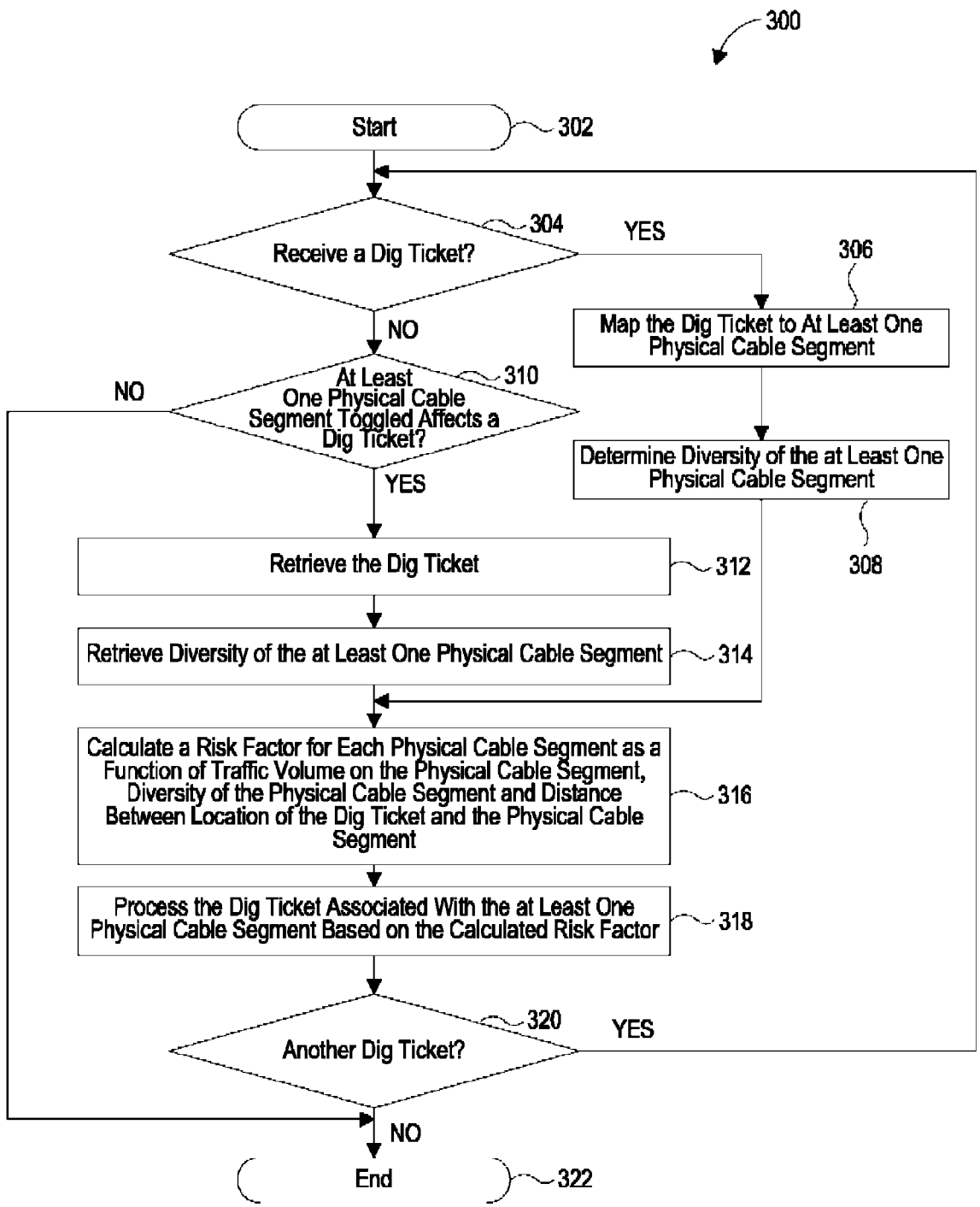
FIG. 3 is a flowchart that illustrates an example method to process a dig ticket in accordance with diversity of one or more physical cable segments of a logical circuit associated with the dig ticket based on network alarms associated with at least one other logical circuit a failure or restoration of which affects diversity of the one or more physical cable segments.

FIG. 3 is a flowchart that illustrates an example method 300 to process a dig ticket in accordance with diversity of one or more physical cable segments of a logical circuit associated with the dig ticket based on network alarms associated with at least one other logical circuit a failure or restoration of which affects diversity of the one or more physical cable segments. The method starts at operation 302. At operation 304, a determination is made as to whether a dig ticket is received. For example, the ticket receiver/retrieval module 148 may determined whether a dig ticket is received from the ticket generation system 126.

If it is determined that a dig ticket has been received at operation 304, the method 300 continues at operation 306, where the dig ticket is mapped to at least one physical cable segment. For example, the ticket-segment mapper module 150 may map the dig ticket 118 to at least one physical cable segment (of logical circuit A 112). At operation 308, diversity of the at least one physical cable segment is determined. For example, the segment diversity determination/retrieval module 152 may determine diversity of the at least one physical cable segment. Thereafter, the method 300 continues at operation 316.

If it is determined that a dig ticket has been not received at operation 304, the method 300 continues at operation 310, where a determination is made as to whether at least one physical cable segment that has been toggled (e.g., set or rest) affects a dig ticket. For example, the ticket receiver/retrieval module 148 may determine whether at least one physical cable segment whose state flag has been toggled affects a dig ticket that was received previously.

If at operation 310, it is determined that no dig ticket is affected, the method 300 ends at operation 322. If at operation 310, it is determined that a dig ticket is affected, the method 300 continues at operation 312, where the dig ticket (received previously) is retrieved. For example, the ticket receiver/retrieval module 148 may retrieve the dig ticket from a database associated with the ticket handling system 132, for example. At operation 314, diversity of the at least one physical cable segment is retrieved. For example, the segment diversity determination/retrieval module 152 may retrieve the dig ticket. Thereafter, the method 300 continues at operation 316.

At operation 316, a risk factor of each of the at least one physical cable segment is calculated as a function of traffic volume on the physical cable segment, diversity of the physical cable segment (as a percentage), and a distance between a location of the dig ticket and the physical cable segment. For example, the risk factor calculation module 154 calculates the risk factor for each physical cable segment as volume of traffic on the physical cable segment, multiplied by diversity of the physical cable segment (as a percentage), and divided by a distance between a location of the dig ticket and the physical cable segment. At operation 318, the dig ticket associated with the at least one physical cable segment is processed based on the calculated risk factor. For example, the ticket processing module 156 may process the at least one physical cable segment based on the calculated risk factor.

At operation 320, a determination is made as to whether there is another dig ticket to receive or retrieve. If it is determined that there is another dig ticket at operation 320, the method 300 continues at operation 304. Alternatively, if it is determined that there is no other dig ticket at operation 320, the method 300 ends at operation 322. For example, the ticket receiver/retrieval module 146 may determine whether there is another dig ticket.

Figure 4:
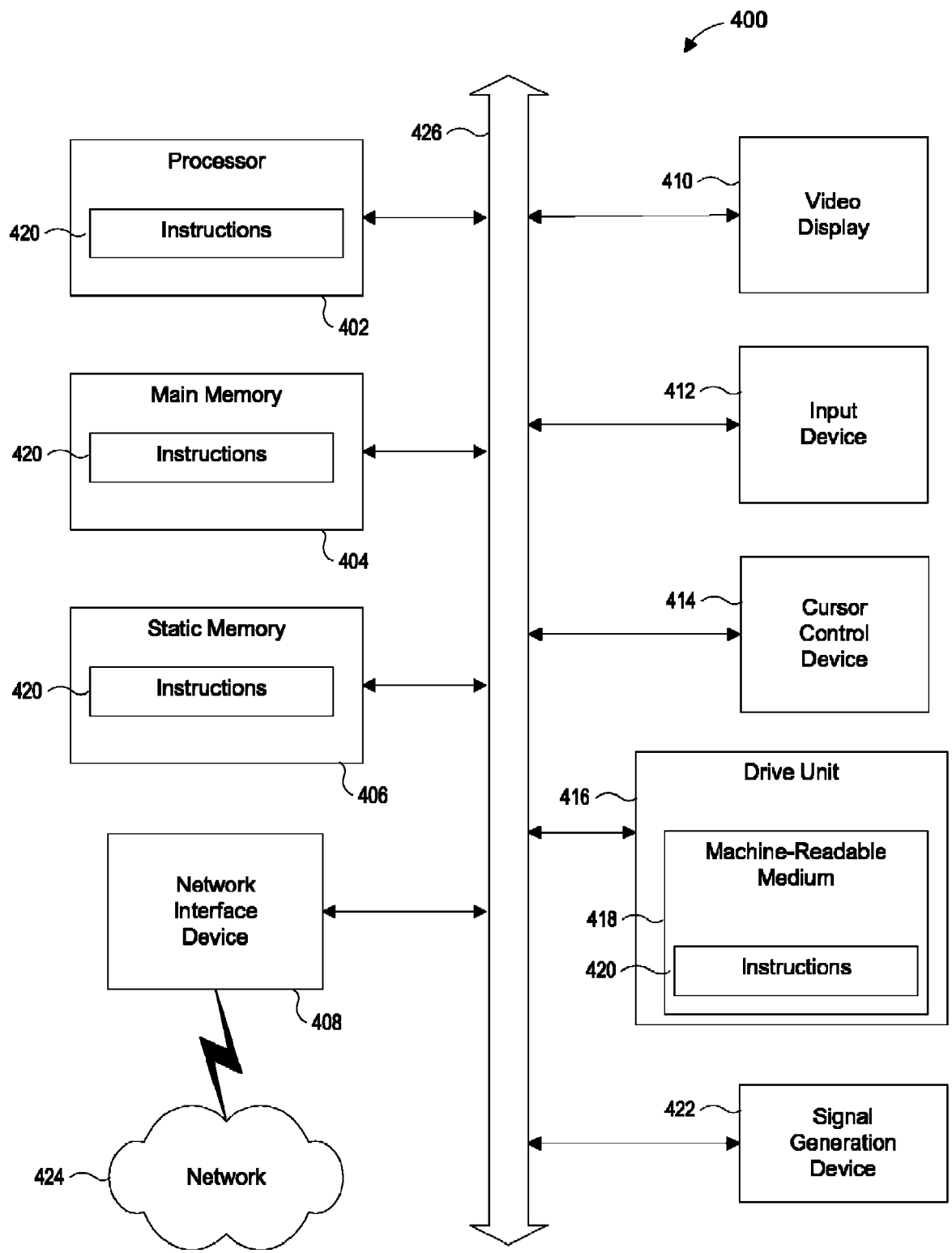
FIG. 4 is a block diagram that illustrates a general computer system.

FIG. 4 is a block diagram that illustrates a general computer system 800. The computer system 400 may include a set of instructions that may be executed to cause the computer system 400 to perform any one or more of the computer based functions or methods disclosed herein. The computer system 400, or any portion thereof, may operate as a standalone device or may be connected, e.g., using a network, to other computer systems or peripheral devices.

In a networked deployment, the computer system 400 may operate in the capacity of a network element, a network alarm system, a ticket generation system, or a ticket handling system. The computer system 400 may also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics-processing unit (GPU), or both. Moreover, the computer system 400 may include a main memory 404 and a static memory 406 that may communicate with each other via a bus 426. As shown, the computer system 400 may further include a video display unit 410, such as a liquid crystal display (LCD), an organic light emitting diode (OLED), a projection unit, a television, a flat panel display, a solid state display, or a cathode ray tube (CRT). Additionally, the computer system 400 may include an input device 412, such as a keyboard, and a cursor control device 414, such as a mouse. The computer system 400 may also include a disk drive unit 416, a signal generation device 422, such as a speaker or remote control, and a network interface device 408.

In a particular embodiment, as depicted in FIG. 4, the disk drive unit 416 may include a computer-readable medium 418 in which one or more sets of instructions 420, e.g., software, may be embedded. Further, the instructions 420 may embody one or more of the methods or logic as described herein. In a particular embodiment, the instructions 420 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 420 or receives and executes instructions 420 responsive to a propagated signal, so that a device connected to a network 424 may communicate voice, video or data over the network 424. Further, the instructions 420 may be transmitted or received over the network 424 via the network interface device 408.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system, method and computer-readable storage medium for handling dig tickets to mitigate physical cable damage have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The provide drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept. Thus, although specific embodiments have been illustrated and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 34 C.F.R. §1.42(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

The invention claimed is:

1. A method of handling a dig ticket to mitigate physical cable damage, the method comprising:
   receiving a network alarm indicating a logical circuit;
   mapping the logical circuit to at least one physical cable segment associated with the logical circuit;
   determining one or more other physical cable segments diversity of which is affected by the at least one physical cable segment;
   updating the diversity associated with the one or more other physical cable segments; and
   processing the dig ticket based at least on a risk factor that accounts for the diversity of at least one physical cable segment of the one or more other physical cable segments.

2. The method of claim 1, wherein receiving a network alarm indicating a logical circuit includes receiving a first network alarm that indicates the logical circuit has failed and indicates an expiration time period associated with the first network alarm.

3. The method of claim 1, wherein receiving a network alarm indicating a logical circuit includes receiving a second network alarm that indicates the logical circuit has been restored.

4. The method of claim 1, wherein the method further comprises toggling a state flag associated with each of the one or more other physical cable segments indicating affected diversity.

5. The method of claim 4, wherein toggling a state flag associated with each of the one or more other physical cable segments indicating affected diversity includes setting the state flag to a first value when the network alarm indicates that logical circuit has failed.

6. The method of claim 4, wherein toggling a state flag associated with each of the one or more other physical cable segments indicating affected diversity includes setting the state flag to a second value when the network alarm indicates that logical circuit has been restored.

7. The method of claim 4, wherein the method further comprises:
   determining whether a physical cable segment of the one or more other physical cable segments for which the state flag has been toggled affects the dig ticket;
   retrieving the diversity of the physical cable segment; and
   calculating the risk factor for the physical cable segment as a function of traffic volume of the physical cable segment, diversity of the physical cable segment, and a distance from a location associated with the dig ticket to a location associated with the physical cable segment.

8. The method of claim 1, wherein the method further comprises:
   mapping the dig ticket to a physical cable segment of the one or more other physical cable segments;
   determining the diversity of the physical cable segment; and
   calculating the risk factor for the physical cable segment as a function of traffic volume of the physical cable segment, diversity of the physical cable segment, and a distance from a location associated with the dig ticket to a location associated with the physical cable segment.

9. A system for handling a dig ticket to mitigate physical cable damage, the system comprising:
   an alarm receiver module configured to receive a network alarm indicating a logical circuit;
   a circuit-segment mapper module configured to map the logical circuit to at least one physical cable segment associated with the logical circuit;
   a segment diversity update module configured to determine one or more other physical cable segments diversity of which is affected by the at least one physical cable segment, the segment diversity update module further configured to update the diversity associated with the one or more other physical cable segments; and
   a ticket processing module configured to process the dig ticket based at least on a risk factor that accounts for the diversity of at least one physical cable segment of the one or more other physical cable segments.

10. The system of claim 9, wherein the network alarm is a first network alarm that indicates the logical circuit has failed and indicates an expiration time period associated with the first network alarm.

11. The system of claim 9, wherein the network alarm is a second network alarm that indicates the logical circuit has been restored.

12. The system of claim 9, wherein the system further comprises a segment state module configured to toggle a state flag associated with each of the one or more other physical cable segments indicating affected diversity.

13. The system of claim 12, wherein segment state module configured to set the state flag to a first value when the network alarm indicates that logical circuit has failed.

14. The system of claim 12, wherein segment state module configured to set the state flag to a second value when the network alarm indicates that logical circuit has been restored.

15. The system of claim 12, wherein the system further comprises:
 a segment diversity determination/retrieval module configured to determine whether a physical cable segment of the one or more other physical cable segments for which the state flag has been toggled affects the dig ticket, the a segment diversity determination/retrieval module further configured to retrieve the diversity of the physical cable segment; and
 a risk factor calculation module configured to calculate the risk factor for the physical cable segment as a function of traffic volume of the physical cable segment, diversity of the physical cable segment, and a distance from a location associated with the dig ticket to a location associated with the physical cable segment.

16. The system of claim 9, wherein the system further comprises:
 a ticket-segment mapper module configured to map the dig ticket to a physical cable segment of the one or more other physical cable segments;
 a segment diversity determination/retrieval module configured to determine the diversity of the physical cable segment; and
 a risk factor calculation module configured to calculate the risk factor for the physical cable segment as a function of traffic volume of the physical cable segment, diversity of the physical cable segment, and a distance from a location associated with the dig ticket to a location associated with the physical cable segment.

17. A non-transitory computer-readable storage medium storing operational instructions that, when executed by a processor, cause the processor to:
 receive a network alarm indicating a logical circuit;
 map the logical circuit to at least one physical cable segment associated with the logical circuit;
 determine one or more other physical cable segments diversity of which is affected by the at least one physical cable segment;
 update the diversity associated with the one or more other physical cable segments; and
 process a dig ticket based at least on a risk factor that accounts for the diversity of at least one physical cable segment of the one or more other physical cable segments.

18. The computer-readable storage medium of claim 17, wherein instructions causing the processor to receive a network alarm indicating a logical circuit include instructions that, when executed by the processor, cause the processor to receive a first network alarm that indicates the logical circuit has failed and indicates an expiration time period associated with the first network alarm.

19. The computer-readable storage medium of claim 17, wherein instructions causing the processor to receive a network alarm indicating a logical circuit include instructions that, when executed by the processor, cause the processor to receive a second network alarm that indicates the logical circuit has been restored.

20. The computer-readable storage medium of claim 17, further storing instruction that, when executed by the processor, cause the processor to toggle a state flag associated with each of the one or more other physical cable segments indicating affected diversity.

21. The computer-readable storage medium of claim 20, wherein instructions causing the processor to toggle a state flag associated with each of the one or more other physical cable segments indicating affected diversity include instructions that, when executed by the processor, cause the processor to set the state flag to a first value when the network alarm indicates that logical circuit has failed.

22. The computer-readable storage medium of claim 20, wherein instructions causing the processor to toggle a state flag associated with each of the one or more other physical cable segments indicating affected diversity include instructions that, when executed by the processor, cause the processor to set the state flag to a second value when the network alarm indicates that logical circuit has been restored.

23. The computer-readable storage medium of claim 20, further storing instruction that, when executed by the processor, cause the processor to:
 determine whether a physical cable segment of the one or more other physical cable segments for which the state flag has been toggled affects the dig ticket;
 retrieve the diversity of the physical cable segment; and
 calculate the risk factor for the physical cable segment as a function of traffic volume of the physical cable segment, diversity of the physical cable segment, and a distance from a location associated with the dig ticket to a location associated with the physical cable segment.

24. The computer-readable storage medium of claim 17, further storing instruction that, when executed by the processor, cause the processor to:
 map the dig ticket to a physical cable segment of the one or more other physical cable segments;
 determine the diversity of the physical cable segment; and
 calculate the risk factor for the physical cable segment as a function of traffic volume of the physical cable segment, diversity of the physical cable segment, and a distance from a location associated with the dig ticket to a location associated with the physical cable segment.

* * * * *